(12) United States Patent
Shih et al.

(10) Patent No.: US 7,289,220 B2
(45) Date of Patent: Oct. 30, 2007

(54) BROADBAND CAVITY SPECTROMETER APPARATUS AND METHOD FOR DETERMINING THE PATH LENGTH OF AN OPTICAL STRUCTURE

(75) Inventors: Chih-Kang Shih, Austin, TX (US); Christopher Wieland, Austin, TX (US); Edward Flagg, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 215 days.

(21) Appl. No.: 11/250,954

(22) Filed: Oct. 14, 2005

(65) Prior Publication Data

US 2007/0086018 A1 Apr. 19, 2007

(51) Int. Cl.
*G01B 9/02* (2006.01)
*G01B 11/02* (2006.01)
*G01J 3/45* (2006.01)

(52) U.S. Cl. .................................. 356/454; 356/506
(58) Field of Classification Search ................ 356/454, 356/480, 505, 506, 519
See application file for complete search history.

(56) References Cited

U.S. PATENT DOCUMENTS

| | | | | |
|---|---|---|---|---|
| 5,483,341 | A * | 1/1996 | Naganuma | 356/450 |
| 6,359,692 | B1 * | 3/2002 | Groot | 356/512 |
| 2002/0109851 | A1 * | 8/2002 | Deck | 356/512 |
| 2003/0137671 | A1 * | 7/2003 | De Groot et al. | 356/512 |
| 2003/0160968 | A1 * | 8/2003 | Deck | 356/515 |
| 2005/0213870 | A1 * | 9/2005 | Kersey et al. | 385/13 |
| 2007/0006663 | A1 * | 1/2007 | Zerwekh et al. | 73/800 |

* cited by examiner

*Primary Examiner*—Patrick Connolly
(74) *Attorney, Agent, or Firm*—Winstead PC

(57) ABSTRACT

A broadband light source with a sufficiently long coherence length is impinged on the optical cavity. The broadband laser light reflects from the first and second surfaces of the cavity. The two light beams, either reflected or transmitted, are phase shifted from one another by an amount proportional to the optical path length of the cavity and inversely proportional to the wavelength of the light ($4\pi nd/\lambda$) The two light beams interfere with each other and form a modulated light beam that has a spectrum approximately like the laser's broadband spectrum multiplied by a cosine with a frequency $4\pi nd/\lambda$. The modulated light beam is coupled to a spectrometer that measures the intensity of the light as a function of wavelength over a range of wavelengths. The Fourier transform of the spectrum contains a peak that is related to the OPL and is located at $2*n*d$ where $n*d$ is the OPL.

24 Claims, 5 Drawing Sheets

BROADBAND CAVITY SPECTROMETER APPARATUS AND METHOD FOR DETERMINING THE PATH LENGTH OF AN OPTICAL STRUCTURE

TECHNICAL FIELD

The present invention relates to apparatus and methods for measuring the optical path length in optical cavities.

BACKGROUND INFORMATION

An optical cavity may be any region bounded by two or more reflective interfaces that are aligned to provide multiple reflections of light waves. Optical cavities have been monitored or measured using a single wavelength illumination source such as a helium/neon (HeNe) laser. A change in the cavity size is detected by observing the change in reflected or transmitted intensity at the single wavelength. Monitoring a single wavelength reflected intensity requires a much larger signal-to-noise ratio (S/N) than a broadband technique. In certain applications, the cavity is filled with a fluid that is designed to have an index of refraction as close as possible to that of the bounding surfaces, making the reflectivity very small. In such cases, the S/N will be small and thus may not be sufficient to use a single wavelength technique. In a single wavelength system, there is not a one-to-one correspondence between the measured intensity to the optical path length; in other words, a measured intensity may correspond to any number of optical path lengths. Therefore, a single-wavelengh system cannot determine the absolute value of the optical path length, it can only detect changes. The change in optical path length as measured by a single-wavelengh system is sufficient for some servo applications where the path length is to be held constant; however, this allows the possibility of mode-hopping where the servo unintentionally and undesirably locks onto a different spectral mode.

Therefore, there is a need for an apparatus and method for measuring or monitoring an optical cavity path length with an output that provides the absolute value of the optical path length, has better S/N tolerance, is free of mode-hopping limitations, and offers near real time operation.

SUMMARY OF THE INVENTION

A broadband light source with a sufficiently long coherence length is impinged upon an optical cavity. In one embodiment, the broadband laser light reflects from the first and second surfaces of the optical cavity generating multiple reflected light beams. Generally, the two most intense beams will be those that are only reflected once: one from the first surface and one from the second. These two beams are sufficient to produce the necessary interference signal. Therefore, ignoring the weaker reflected beams will not change the functionality of the invention and for simplicity the discussion is limited to the first two beams.

In another embodiment, the modulated light beam transmitted through the optical cavity is used to produce the necessary interference signal. In general, when light is incident on a reflective surface, it is partially transmitted and partially reflected. The transmitted light beam is primarily comprised of the following two beams: that which is transmitted through both the first and second surfaces of the optical cavity; and that which is transmitted through the first surface, reflected from the second surface, reflected again from the first, and finally transmitted through the second surface. These two beams are sufficient to produce the necessary interference signal. Therefore, ignoring the weaker transmitted beams will not change the functionality of the invention and for simplicity the discussion is limited to these two beams.

The two broadband reflected (or transmitted) light beams are phase shifted from one another by an amount proportional to the optical path length (OPL) of the optical cavity. They interfere with each other and produce a modulated light beam that has a spectrum that looks approximately like the broadband laser's spectrum multiplied by a cosine with a frequency $(4*\pi*n*d/\lambda)$, where n is the index of refraction of the medium within the cavity, d is the physical separation between the cavity surfaces, and $\lambda$ is the wavelength of the light. The combined modulated light is coupled to a spectrometer which outputs a spectrum that is a measure of the intensity of the light as a function of wavelength, over a range determined by the spectrometer specifications. The spectrum is changed to a function of wavenumber, where for our purposes the wavenumber is the reciprocal of the wavelength. The spectrum is Fourier transformed, resulting in the Fourier amplitude as a function of a variable that is the reciprocal of the wavenumber. The Fourier transform contains at least one peak that is located at the independent variable coordinate $2*n*d$, where $n*d$ is the OPL.

The Fourier transform of the spectrum will contain a DC peak and at least one other peak that is related to the OPL. The certainty that the Fourier transform of the spectrum of the light reflected from or transmitted through the optical cavity has a peak located at a coordinate equal to twice the OPL is a key feature of the present invention. By locating and tracking the position of this peak, one is able to measure and track the OPL directly. Due to the nature of the spectrum of the light reflected from the optical cavity, this OPL peak will be the most prominent one aside from the DC peak (whose location is known). This feature adds to the ease of tracking the OPL with the Fourier transform. If efficient Fourier algorithms are used with sufficiently fast computer technology, the OPL may be tracked in real-time, for example, during a manufacturing process.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION

Figure 1:
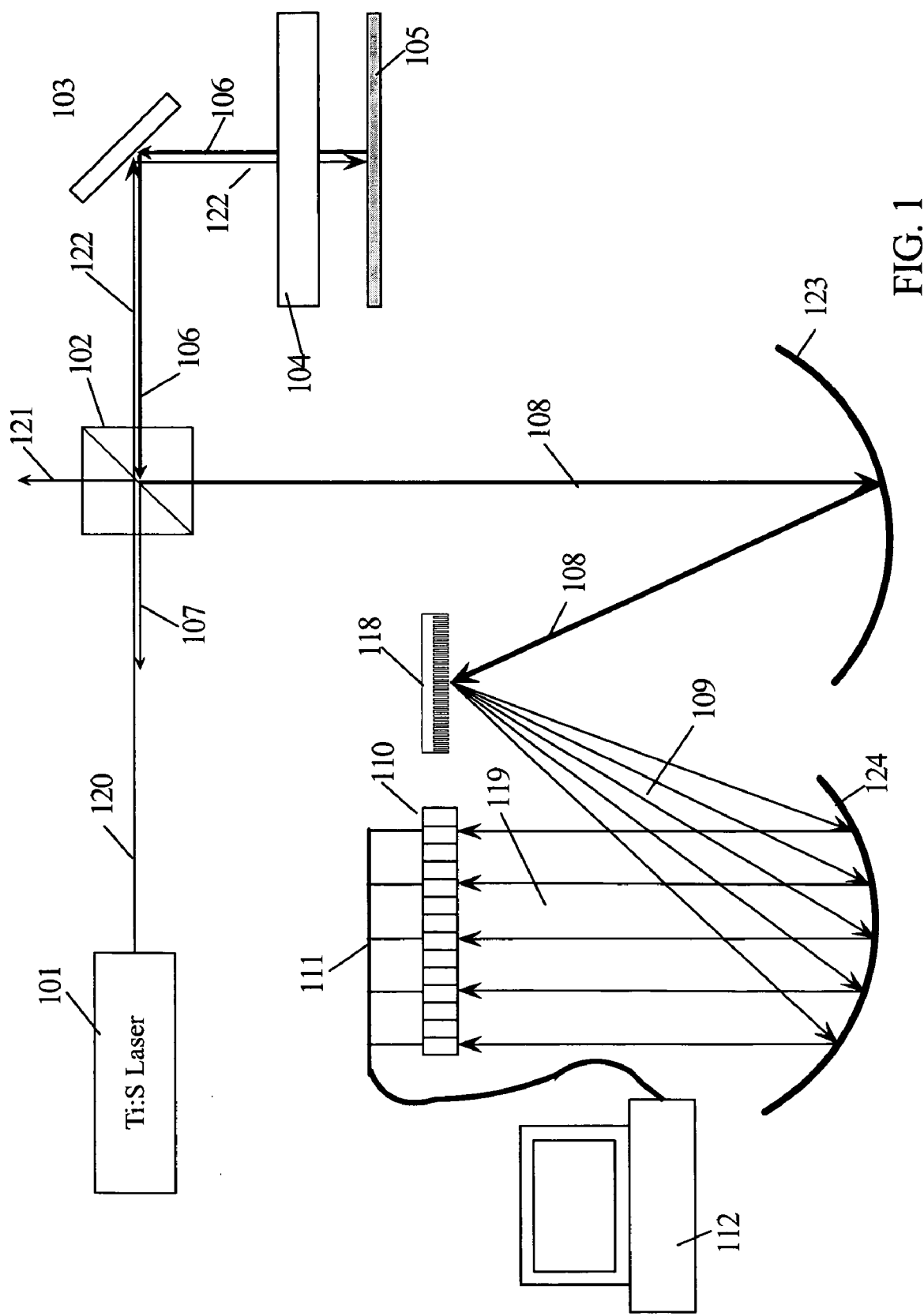
FIG. 1 is a diagram illustrating an apparatus for practicing embodiments of the present invention.

In the following description, numerous specific details are set forth to provide a thorough understanding of the present invention. For example, specific subsystems and functions may be described; however, it would be recognized by those of ordinary skill in the art that the present invention may be practiced without such specific details. In other instances, well-known units or systems have been shown in block diagram form in order not to obscure the present invention in unnecessary detail. Refer now to the drawings wherein depicted elements are not necessarily shown to scale and wherein like or similar elements are designated by the same reference numeral by the several views.

In the following detailed description, a variable may be referred to as having a DC (direct current) component, wherein the variable may not be electrical current. In these cases, DC means that the variable has a static non-changing component. The variable may also have a sinusoidal component which may be referred to as an AC (alternating current) wherein again the variable is not related to electrical current.

The term "spectrometer" (for light) is used to describe a wide range of instruments that are used to determine frequency content of a light signal as a function of a variable and may be a device that incorporates a dispersive element (e.g., prism, reflection grating, or transmission grating, etc.), a recording element (e.g., charge coupled device (CCD) camera, CMOS camera, photodiode array, etc.), and possibly other guiding elements (e.g., mirrors and lenses).

A Fourier transform is a mathematical operation that re-expresses a function in terms of a sum or integral of sinusoidal basis functions. Often it is associated with converting a periodic signal as a function of time into an amplitude as a function of frequency (the reciprocal of time). However, in this disclosure the Fourier transform is applied to spectrum amplitudes (intensity) as a function of wavenumber, wherein the Fourier transform again generates a Fourier amplitude as a function of the reciprocal of that variable (length). There exist many efficient Fourier transform algorithms including so-called Fast Fourier Transform (FFT) variants, Fourier transforms may be performed using such techniques as streamlined Fourier transform algorithms, fast non-equal-spaced discrete Fourier transform (FNDFT), or other fast Fourier transform algorithms suitable for the desired speed of determining the OPL. These algorithms may be performed with specialized digital signal processing (DSP) hardware or computers receiving data from a fast-recording charge coupled digital (CCD) camera to facilitate real time operation.

In the following description, a "suitable" broadband light source is used as an integral part of the measurement technique. The requirements for the "suitable" broadband light source, for use in embodiments of the present invention, depend somewhat on the optical path length (OPL) to be measured. An example of a suitable broadband light source is a mode-locked Titanium:Sapphire laser (Ti:S). Specifications for a suitable broadband light source comprise parameters as the following:

(1) The coherence length of a light source is the distance over which the phase of the light wave remains in phase with light just emerging from the source. A suitable broadband light source, for the present invention, must have a coherence length longer than twice the OPL to be measured. Precisely how much longer depends in a complicated way on the reflectivities of the two cavity surfaces. Any broadband laser has a coherence length of many tens of meters and so would definitely be suitable for typical optical cavities. For very short OPLs (e.g., several hundred nanometers), a light source normally considered incoherent, like a halogen lamp, would work (it is still "coherent" but only over much shorter distances).

(2) The broadband light source has measurable bandwidth large enough so that when its light is modulated by the optical cavity the modulated light's spectrum contains the number of interference fringes necessary to determine the OPL to a desired resolution. For a given spectrometer resolution, more fringes results in a more precise determination of the OPL.

FIG. 1 is an apparatus suitable for practicing embodiments of the present invention. Ti:S Laser 101 is used as a broadband light source suitable for practicing embodiments of the present invention. The incident light beam 120 impinges on beam splitter 102 which transmits a portion of the light beam 122 and diverts a portion 121 which is not used. Light beam 122 is reflected from mirror 103 and to an exemplary optical cavity formed between silica window 104 and silicon wafer 105. Light beam 106 represents the combination of the light beams reflected from the two surfaces of the optical cavity. Mirror 103 directs light beam 106 to beam splitter 102 and a portion of light beam 106 is transmitted (107) and a portion is directed to curved mirror 123 as light beam 108. Light beam 108 is directed to reflection grating 118 by mirror 123. Reflection grating 118 breaks light beam 108 into light beams 109 distributed uniformly by wavelength. Light beams 109 are each directed to parabolic mirror 124 which then directs each light beam to a light detector element in detector 110. The output of the detector elements 110 are coupled in parallel as signals 111 to computer 112 which has digital signal processing (DSP) hardware for digitizing and processing the individual signals 111 produced by detecting the individual light beams 109. The signals 111 form the spectrum of the reflected light 106. The DSP hardware in computer 112 may be programmed to perform a Fourier transform on the signals 111 (spectrum of reflected light 106) according to embodiments of the present invention.

Figure 2A:
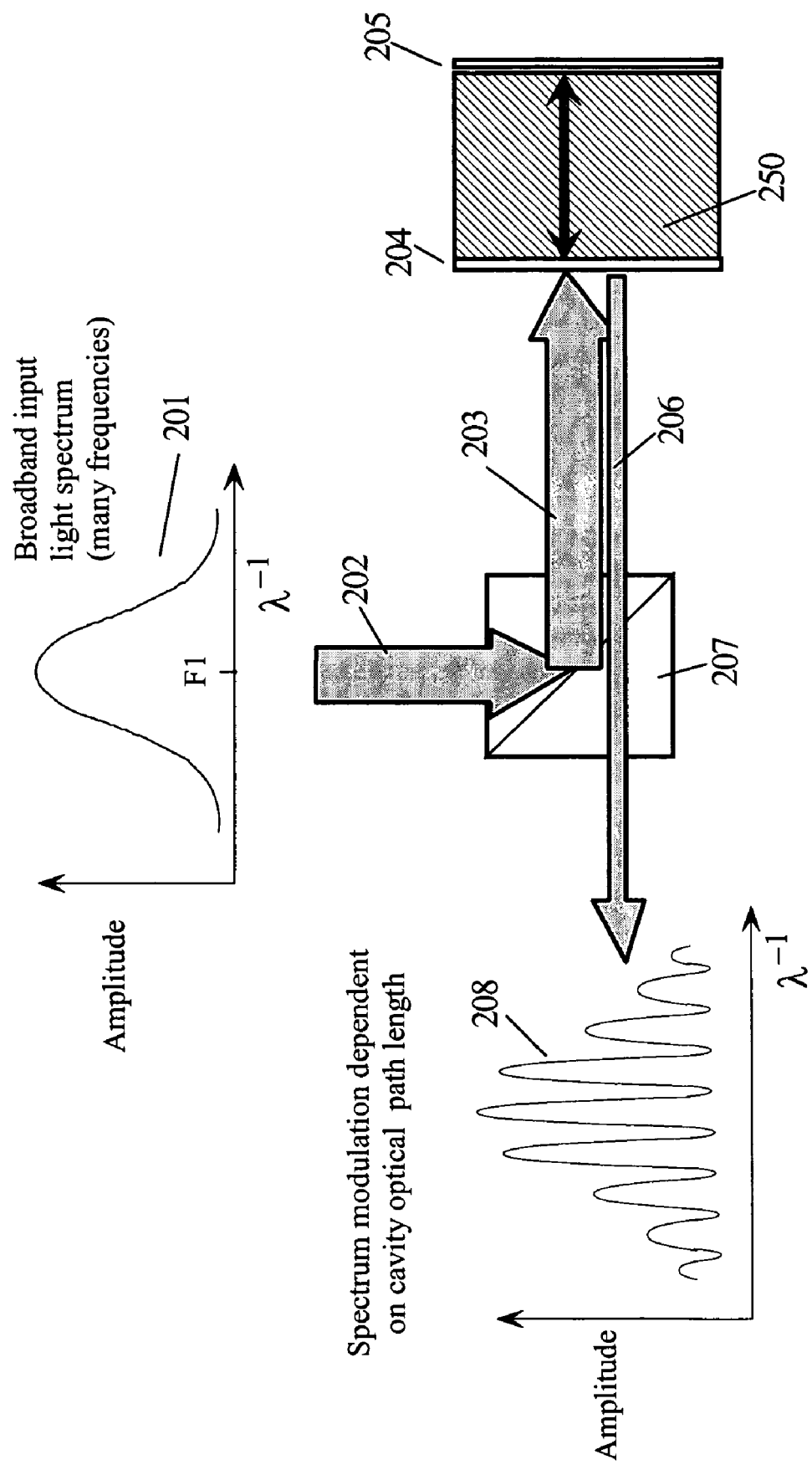
FIG. 2A is a diagram of the broad band input spectrum and the spectrum of the reflected light from the optical cavity.

FIG. 2A is a diagram illustrating spectrum of the incident and reflected light according to embodiments of the present invention. Optical cavity 250 has a first surface 204 and a second surface 205 defining its optical path length. Broadband input light beam 202 has a continuous distribution of many light frequencies centered around frequency F1. Input light beam 202 is directed by beam splitter 207 to optical cavity 250 as light beam 203. The combination of the two beams reflected from surfaces 204 and 205 is reflected light beam 206 which has a spectrum 208 which looks like the input spectrum 201 modulated by the cosine of a frequency that is dependent on the dimensions of the optical cavity and the index of refraction of the material 210 within the cavity.

Figure 2B:
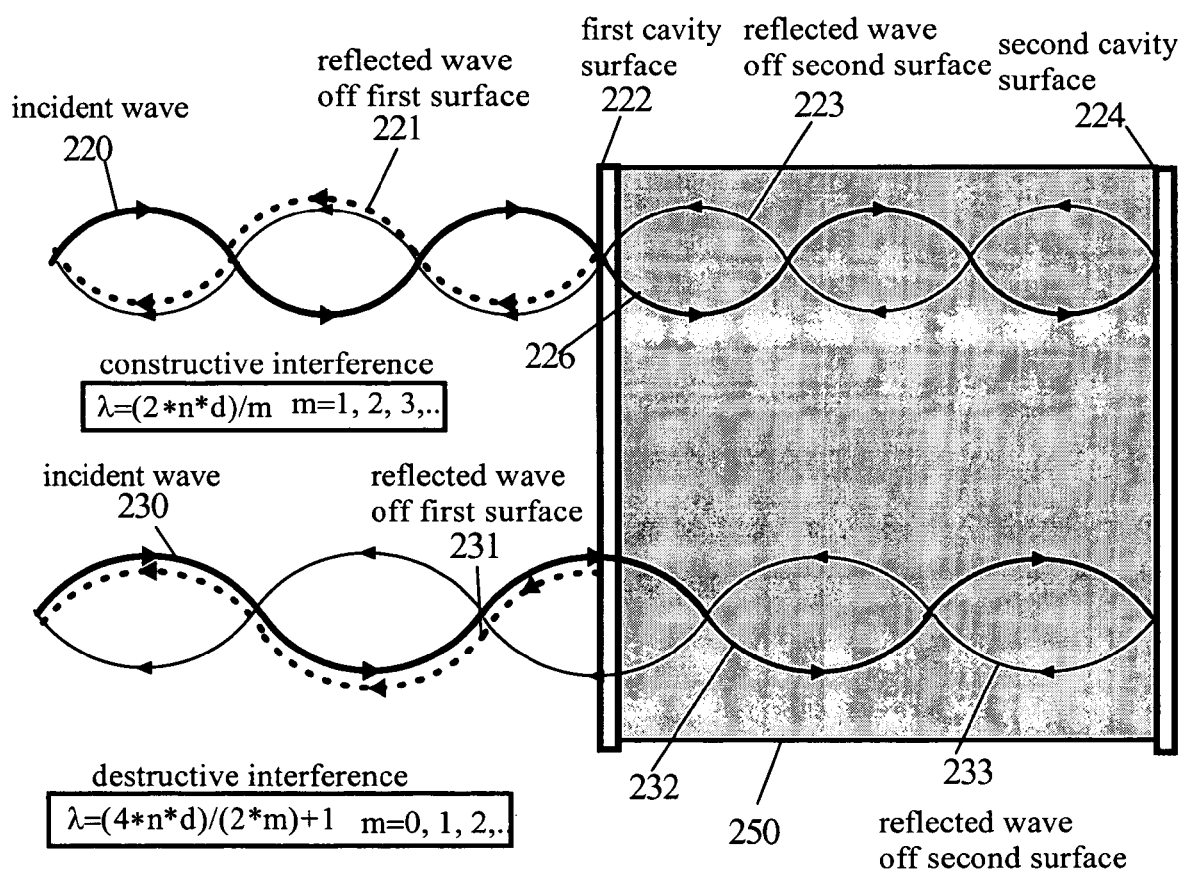
FIG. 2B is a diagram illustrating which wavelengths of incident light have constructive interference for a given cavity and which have destructive interference.

FIG. 2B illustrates constructive and destructive interference of the light reflected from the surfaces 222 and 224 as a function of dimensions of the optical cavity 250. Exemplary incident wave 220 is partially reflected from surface 222 as reflected wave 221. A portion of incident wave 220 continues as transmitted wave 226 and is reflected from second surface 224 of optical cavity 250 as reflected wave 223. Incident wave 220 has a wavelength whose relationship with the cavity OPL is such that reflected wave 221 is in phase with reflected wave 223 and they constructively interfere. The relationship between the light wavelength and the optical cavity dimensions for constructive interference are given by the formula $\lambda=(2*n*d)/m$ where (m=1, 2, 3 ... ). In this example, $2*n*d$ (twice the optical cavity length) is equal to 3 wave lengths of incident wave 220 therefore m is equal to 3.

Exemplary incident wave 230 represents a different wavelength of light. Incident wave 230 is partially reflected from surface 222 as wave 231. A portion of incident wave 230 continues as transmitted wave 232 and is reflected from second surface 224 of optical cavity 250 as reflected wave 233. This time incident wave 230 has a wavelength whose relationship with the cavity OPL is such that reflected wave 221 is out of phase with reflected wave 223, resulting in destructive interference. The relationship between the light wavelength and the optical cavity dimensions for destructive interference are given by the formula $(\lambda=(4*n*d)/(2m+1))$ where (m=0, 1, 2, 3 ... ). In this example, $2*n*d$ (twice the optical cavity length) is equal to 2¼ wavelengths of incident wave 230 therefore m is equal to 2.

Figure 2C:
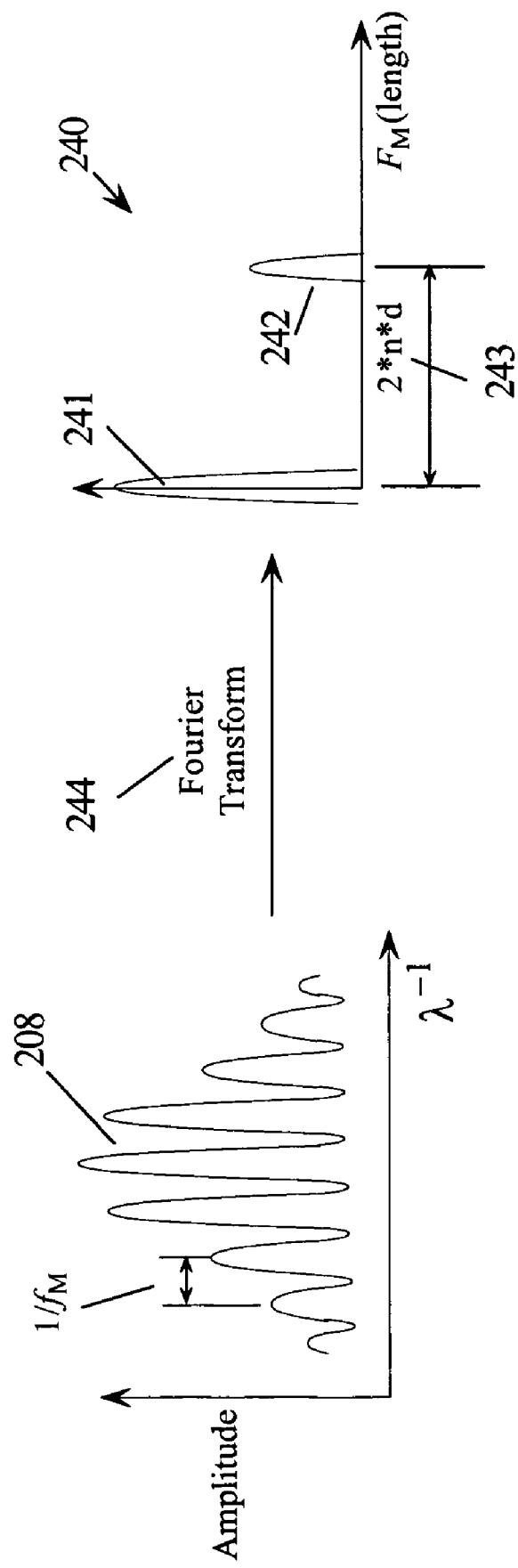
FIG. 2C is a diagram illustrating a graph of a Fourier transform of a reflected spectrum from an optical cavity according to embodiments of the present invention.

FIG. 2C illustrates the resulting graph 240 when the Fourier transform is applied to the spectrum 208 according to embodiments of the present invention. Since the spectrum 208 is the intensity as a function of the wavenumber (inverse of wavelength), its independent axis has the dimension of (1/length). The Fourier transform of the spectrum 208 transforms this dimension so the independent axis of graph 240 has the dimension of (length). Graph 240 will have a DC peak corresponding to the DC component of the spectrum 208, and another significant peak located at a coordinate corresponding to $2*n*d$, or twice the optical length of the optical cavity. This allows the optical length of the optical cavity to be determined directly by locating this peak in the Fourier transform.

Mathematically the Fourier transform of spectrum 208 has at least three peaks; a center peak that corresponds to the non-changing or DC component located at the coordinate $F_M=0$. There are two resulting sidebands that represent the modulation frequency due to the optical cavity. The sidebands are located at positive and negative values of the modulation frequency $F_M=2*n*d$. The method of the present invention comprises calculating only the positive half of Fourier transform function, and locating the position of the corresponding sideband. The negative half of the Fourier transform function is a mirror image of the positive half and is therefore redundant. While one may use either the positive or negative half of the Fourier transform function, according to embodiments of the present invention, the negative half of the Fourier transform function is normally not calculated to speed up the process of determining the OPL.

To obtain better precision, the Fourier transform may be first coarsely calculated to locate the positive sideband. The Fourier transform is then recalculated only in the region of the sideband, resulting in a savings in processing time and better resolution. This process is repeated until a satisfactory resolution is achieved.

Processing or calculation time is reduced by the following:
(1) only dealing with the positive half of the Fourier transform.
(2) coarsely calculating the Fourier transform to locate the sideband peak.
(3) only calculating a small range around the sideband or the very peak of the sideband both of which also result in better resolution.
(4) using more powerful Fourier transform algorithms that are configured to do "fast" transforms and thus speed up the actual calculation.

Figure 3:
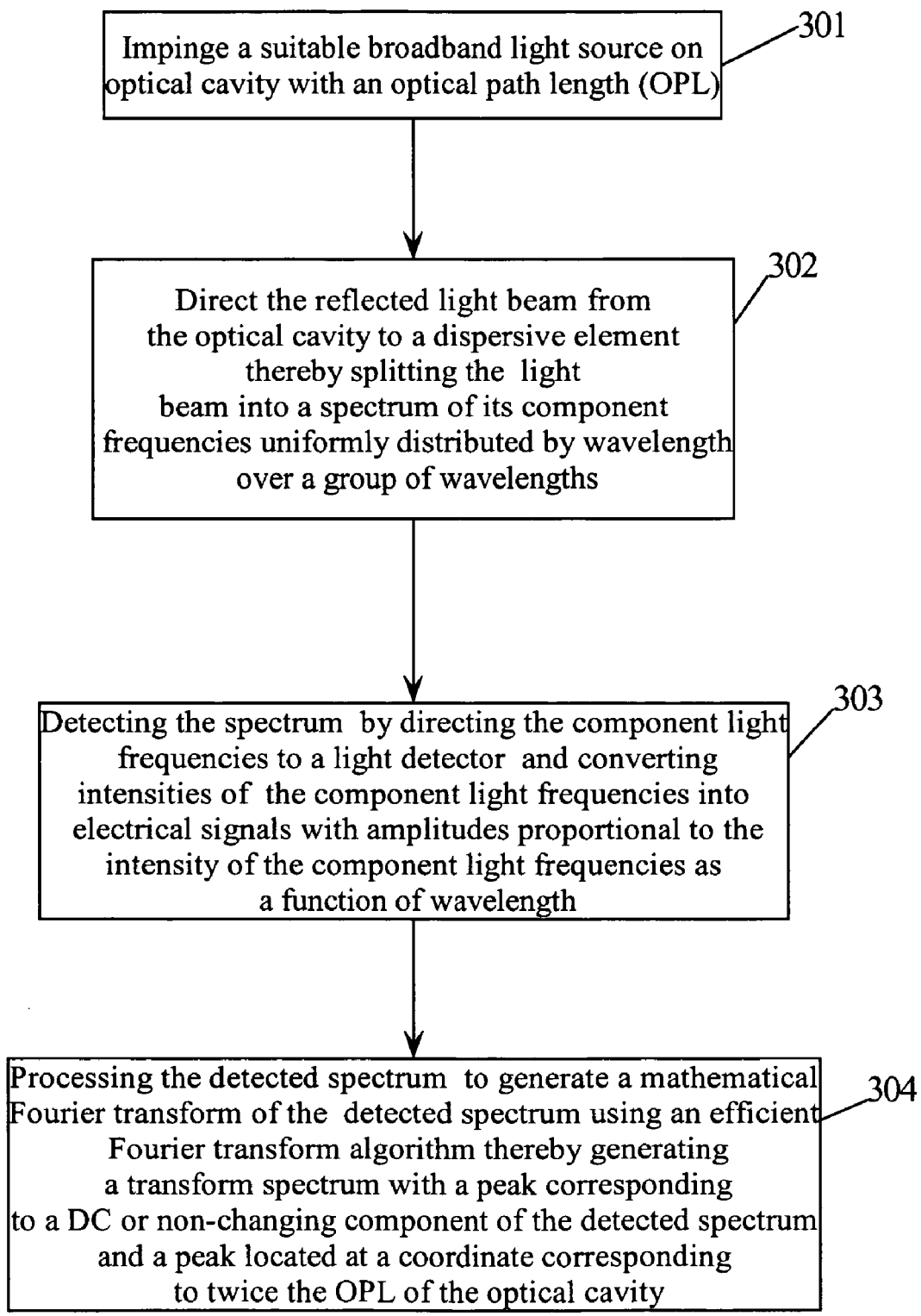
FIG. 3 is a flow diagram of method steps according to embodiments of the present invention.

FIG. 3 is a flow diagram of method steps according to embodiments of the present invention. In step 301, a suitable broadband light source is impinged on the optical cavity with an optical path length to be measured. In step 302, the reflected light beams from the two surfaces of the optical cavity are directed to a dispersive element that spatially splits the reflected light beam into its component light frequencies uniformly distributed by wavelength. In step 303, the spectrum of the component light frequencies of the reflected light beam is converted to electrical signals in a light detector array, wherein the electrical signals have amplitudes proportional to the intensities of the component light frequencies. In step 304, the spectrum is processed to generate a mathematical Fourier transform of the detected spectrum using efficient Fourier transform algorithms, thereby generating a transform spectrum with a peak corresponding to a DC, or non-changing component of the spectrum, and a peak located at a coordinate corresponding to twice the OPL of the optical cavity.

Calibrating the system involves primarily the spectrometer which is the device that records the light intensities for different wavelengths. Spectrometers have standard calibration procedures. Usually they involve a light source that emits light composed of only several known wavelengths. The spectrometer records upon which pixel those lines fall and those pixels are thereby defined using the known wavelength of light. The reason for this is that there may not be, in general, a linear relationship between pixel location and the corresponding wavelength that falls on it. The spectrometer hardware or software takes this into account when collecting data. There is, of course, a limit to how well a spectrometer may be calibrated and any error in the calibration will bias measurement of the OPL either high or low, depending on the error.

Some embodiments of the present invention may allow for the OPL to be measured with a 95% confidence range that the true value of the OPL is within +/−32 nm of the measured value. Other embodiments may have different measurement accuracies.

When the broadband light source with the spectrum 201 is impinged onto an optical cavity (e.g., 250, FIG. 2A) this spectrum is modulated. Let $B(\lambda)$ denote the spectral intensity of the broadband light as a function of wavelength. The optical cavity basically multiplies the spectrum (201) by a cosine function; $\cos(4*\pi*n*d/\lambda)$. Here, $\pi \approx 3.14$, n is the index of refraction within the cavity (for air n=1), d is the distance between cavity surfaces, and $\lambda$ is the wavelength of the light as illustrated in spectrum 201. Now the spectrum of the light beam that is reflected or transmitted from the cavity is described by a new function: $B_M(\lambda)=B(\lambda)*\cos(4*\pi*n*d/\lambda)$. The variable $B_M$ of this spectrum is what is measured by the spectrometer. Each pixel of the spectrometer records the value $B_M$ of this spectrum at a different wavelength of light. The result is a set of data $B_M(\lambda)$, stored digitally, that if plotted versus $(1/\lambda)$, yields the "spectrum" 208 as shown in FIG. 2A. This stored data $B_M(\lambda)$ may now be processed to yield desired results.

Note that the function $\cos(4*\pi*n*d/\lambda)$ may be rewritten as $\cos(2\pi*(2*n*d)*(1/\lambda))$ which shows that it is not periodic in wavelength, $\lambda$, but is periodic in $1/\lambda$. Thus, it becomes convenient to define the variable "wavenumber" as $1/\lambda$. This is a common variable when dealing with waves such as light and is normally written as $k=1/\lambda$. Now the function $\cos(2\pi*(2*n*d)*(1/\lambda))$ may be written as $\cos(2\pi*(2*n*d)*k)$. Therefore the modulation of the spectrum may be described as periodic in k with a modulation frequency $f_M=2*n*d$, wherein $f_M$ has dimensions of length. The modulation frequency is not to be confused with the frequency of the light in the light beams. Spectrum 208 in FIG. 2A has peaks spaced at $1/f_M$ and refers to the "wavelength" of the cosine function $\cos(2\pi*(2*n*d)*k)$. Note that this wavelength ($1/f_M$) is not the wavelength of a light frequency and has the dimension of "1/length". Since the optical path length (OPL) is (n*d), extracting (by digital processing) this frequency $f_M$ is how embodiments of the present invention determine the OPL of an optical cavity.

Although the present invention and its advantages have been described in detail, it should be understood that various changes, substitutions and alterations can be made herein without departing from the spirit and scope of the invention as defined by the appended claims.

What is claimed is:

1. A method for determining an optical path length (OPL) of an optical cavity comprising the steps of:
   a) impinging a light beam from a broadband coherent light source on the optical cavity thereby forming a modulated light beam by optical interference;
   b) directing the modulated light beam from the optical cavity to a light dispersive element thereby splitting the modulated light beam into a spectrum of component light frequencies each having a light intensity and a corresponding light wavelength;
   c) detecting the component light frequencies in a light detector thereby generating spectral data with dimensions of light intensity of the component light frequencies as a function of the wavelength of the component light frequencies; and
   d) processing the spectral data by performing a mathematical Fourier transform of the spectral data using a Fourier transform algorithm, thereby generating a transform spectrum with a Fourier amplitude as a function of an independent length variable, wherein the transform spectrum has a peak corresponding to a non-changing (DC) component of the spectral data, and at least one modulation peak located at a coordinate of the length variable corresponding to twice the OPL of the optical cavity.

2. The method of claim 1, wherein the broadband coherent light source is specified with a set of parameters comprising:
   a coherence length greater than twice the OPL of the optical cavity; and
   a frequency bandwidth sufficient to generate a number of interference fringes necessary to resolve the OPL to a predetermined resolution when light from the broadband coherent light source is modulated by the optical cavity.

3. The method of claim 1, wherein the broadband light source is directed to the optical light cavity through a beam splitter.

4. The method of claim 1, wherein the modulated light beam results from optical interference between a first light beam transmitted through first and second surfaces of the optical cavity and a second light beam transmitted through the second surface of the optical cavity, wherein the second light beam is generated when light from the broadband light source is transmitted through the first surface, reflected off the second surface, reflected off the first surface, and is then transmitted through the second surface of the optical cavity.

5. The method of claim 1, wherein the modulated light beam results from optical interference between a first light beam reflected from a first surface of the optical cavity and a second light beam reflected from a second surface of the optical cavity, wherein the second light beam is generated when light from the broadband light source is transmitted through the first surface, reflected from the second surface and then transmitted through the first surface of the optical cavity.

6. The method of claim 1, wherein the light detector is a linear array light detector having a plurality of discrete light detecting elements each corresponding to one of the component light frequencies and generating an electrical signal proportional to an intensity of received wavelength of light.

7. The method of claim 6, wherein the electrical signals from the plurality of discrete light detecting elements are coupled to a computing device that provides the processing of the spectral data.

8. The method of claim 1, wherein the dispersive element is a device selected from a set of devices consisting of a prism, a reflection grating, and a transmission grating.

9. The method of claim 1, wherein the Fourier transform is calculated over a first set of coordinate points of the length variable in a Fourier domain with a coarse separation between the first set of coordinate points to determine a first location of a positive peak adjacent to the DC peak.

10. The method of claim 9, wherein the Fourier transform is recalculated over a second set of coordinate points of the length variable in the Fourier domain spanning the first location with a fine separation between the second set of coordinate points to increase the resolution of measuring the OPL while keeping calculation time low.

11. The method of claim 9, wherein the Fourier transform is performed using an efficient Fourier transform algorithm configured to reduce processing time.

12. The method of claim 10, wherein the Fourier transform is performed using an efficient Fourier transform algorithm configured to reduce processing time.

13. A system for determining an optical path length (OPL) of an optical cavity comprising:
   a broadband coherent light source providing an incident light beam for impinging on the optical cavity;
   a light dispersive element for receiving a light beam from the optical cavity and splitting the light beam into a spectrum of component light frequencies each having a light intensity and a corresponding light wavelength;
   a detector for detecting the component light frequencies thereby generating spectral data that is light intensity of the component light frequencies as a function of wavelength of the component light frequencies; and
   a computing device for processing the spectral data by performing a mathematical Fourier transform of the spectral data using a Fourier transform algorithm, thereby generating a transform spectrum with a Fourier amplitude as a function an independent length variable, wherein the transform spectrum has a peak corresponding to a non-changing (DC) component of the spectral data, and at least one modulation peak located at a coordinate of the length variable corresponding to twice the OPL of the optical cavity.

14. The system of claim 13, wherein the broadband coherent light source is specified with a set of parameters comprising:
   a coherence length greater than twice the OPL of the optical cavity; and
   a frequency bandwidth sufficient to generate a number of interference fringes necessary to resolve the OPL to a predetermined resolution when light from the broadband coherent light source is modulated by the optical cavity.

15. The system of claim 13, wherein the broadband light source is directed to the optical light cavity through a beam splitter.

16. The system of claim 13, wherein the modulated light beam results from optical interference between a first light beam transmitted through first and second surfaces of the optical cavity and a second light beam transmitted through the second surface of the optical cavity, wherein the second light beam is generated when light from the broadband light source is transmitted through the first surface, reflected off the second surface, reflected off the first surface, and is then transmitted through the second surface of the optical cavity.

17. The system of claim 13, wherein the modulated light beam results from optical interference between a first light beam reflected from a first surface of the optical cavity and a second light beam reflected from a second surface of the optical cavity, wherein the second light beam is generated when light from the broadband light source is transmitted through the first surface, reflected from the second surface and then transmitted through the first surface of the optical cavity.

18. The system of claim 13, wherein the light detector is a linear array light detector having a plurality of discrete light detecting elements each corresponding to one of the component light frequencies and generating an electrical signal proportional to an intensity of received wavelength of light.

19. The system of claim 18, wherein the electrical signals from the plurality of discrete light detecting elements are coupled to a computing device that provides the processing of the spectral data.

20. The system of claim 13, wherein the dispersive element is a device selected from a set of devices consisting of a prism, a reflection grating, and a transmission grating.

21. The system of claim 13, wherein the Fourier transform is calculated over a first set of coordinate points of the length variable in a Fourier domain with a coarse separation between the first set of coordinate points to determine a first location of a positive peak adjacent to the DC peak.

22. The system of claim 21, wherein the Fourier transform is recalculated over a second set of coordinate points of the length variable in the Fourier domain spanning the first location with a fine separation between the second set of coordinate points to increase the resolution of measuring the OPL while keeping calculation time low.

23. The system of claim 21, wherein the Fourier transform is performed using an efficient Fourier transform algorithm configured to reduce processing time.

24. The system of claim 22, wherein the Fourier transform is performed using an efficient Fourier transform algorithm configured to reduce processing time.

* * * * *